(12) United States Patent
Oh et al.

(10) Patent No.: US 12,253,909 B2
(45) Date of Patent: Mar. 18, 2025

(54) METHOD FOR FEEDBACK OF PROGRAM

(71) Applicant: Korea University Research and Business Foundation, Seoul (KR)

(72) Inventors: Hakjoo Oh, Seoul (KR); Dowon Song, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 224 days.

(21) Appl. No.: 17/950,461

(22) Filed: Sep. 22, 2022

(65) Prior Publication Data

US 2023/0145720 A1 May 11, 2023

(30) Foreign Application Priority Data

Oct. 6, 2021 (KR) .................. 10-2021-0132462

(51) Int. Cl.
G06F 11/36 (2006.01)
G06F 11/07 (2006.01)
G06F 11/3668 (2025.01)

(52) U.S. Cl.
CPC .......... *G06F 11/0793* (2013.01); *G06F 11/36* (2013.01); *G06F 11/3692* (2013.01)

(58) Field of Classification Search
CPC .................................................. G06F 11/3692
USPC ....................................................... 717/124
See application file for complete search history.

(56) References Cited

U.S. PATENT DOCUMENTS

2021/0303272 A1* 9/2021 Yoshida .............. G06F 16/9024

FOREIGN PATENT DOCUMENTS

JP       2010-97426 A    4/2010
KR   10-2000-0038106 A   7/2000
KR      10-1844047 B1    4/2018

(Continued)

OTHER PUBLICATIONS

Dowon Song, Woosuk Lee, and Hakjoo Oh. 2021. Context-Aware and Data-Driven Feedback Generation for Programming Assignments. In Proceedings of the 29th ACM Joint European Software Engineering Conference and Symposium on the Foundations of Software Engineering (ESEC/FSE '21), Aug. 2021.*

(Continued)

*Primary Examiner* — Francisco J Aponte
(74) *Attorney, Agent, or Firm* — NSIP Law

(57) ABSTRACT

Disclosed is a method for feedback of a program, which is performed by a computing device including at least one processor, which include: matching respective functions included in a first program received from an external device with respective functions included in a prestored correct answer program corresponding to the first program; identifying error functions different from the respective functions included in the correct answer program among the respective functions included in the first program; generating at least one repair template including at least one reference function extracted based on a calling-context for a function of a specific function in order to repair the error function among the prestored functions; generating a first edit script for repairing the error function to at least one reference function based on a first repair template among one or more repair templates; and transmitting a signal including the first edit script to the external device.

12 Claims, 10 Drawing Sheets

(56) References Cited

FOREIGN PATENT DOCUMENTS

KR    10-2020-0103187 A    9/2020

OTHER PUBLICATIONS

Dragana Milovančević and Viktor Kunak. 2023. Proving and Disproving Equivalence of Functional Programming Assignments. Proc. ACM Program. Lang. 7, PLDI, Article 144 (Jun. 2023), 24 pages.*
Minseok Jeon, Sehun Jeong, and Hakjoo Oh. 2018. Precise and Scalable Points-to Analysis via Data-Driven Context Tunneling. Proc. ACM Program. Lang. 2, OOPSLA, Article 140 (Nov. 2018), 29 pages.*
Jialu Zhang, De Li, John C. Kolesar, Hanyuan Shi, and Ruzica Piskac. 2022. Automated Feedback Generation for Competition-Level Code. In Proceedings of ACM Conference (Conference'17). ACM, New York, NY, USA, 12 pages.*

* cited by examiner

[FIG. 1]
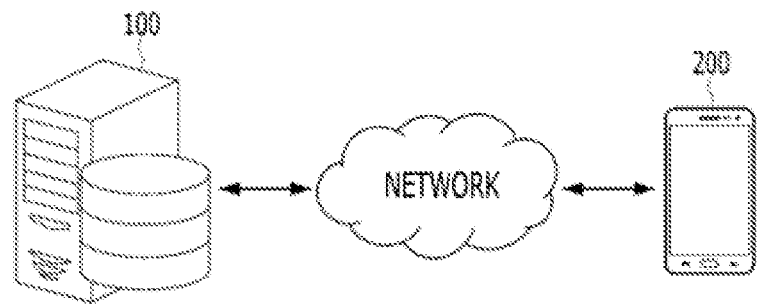

[FIG. 2]
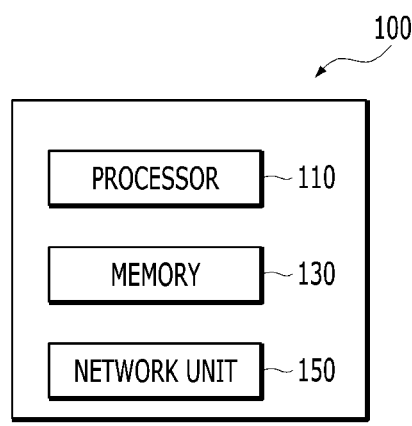

$$\overline{\delta \vdash [\![n]\!]^\ell \rightsquigarrow n \in \sigma(\ell,\delta)} \qquad \overline{\delta \vdash [\![x]\!]^\ell \rightsquigarrow \begin{cases} x \in \sigma(x,\delta) \cap \sigma(\ell,\sigma) & (x \in \{x_i\} \cup Fid) \\ \sigma(x,\delta) \sqsubseteq \sigma(\ell,\sigma) & (o.w.) \end{cases}} \qquad \dfrac{[\![e]\!]^{\ell'} \rightsquigarrow C}{\delta \vdash [\![\lambda x.e]\!]^\ell \rightsquigarrow \lambda x.e \in \sigma(\ell,\delta) \cup C}$$

$$\dfrac{\delta \vdash [\![e_1]\!]^{\ell_1} \rightsquigarrow C_1 \quad \delta \vdash [\![e_2]\!]^{\ell_2} \rightsquigarrow C_2}{\delta \vdash [\![e_1 e_2]\!]^\ell \rightsquigarrow C_1 \cup C_2 \cup \text{fn } \ell_1 : \ell_2 \Rightarrow \ell} \qquad \dfrac{\lambda x.e_0^{\ell_0} \in \sigma(\ell_1,\delta)}{\text{fn } \ell_1 : \ell_2 \Rightarrow \ell \rightsquigarrow \{\sigma(\ell_2,\delta), \sigma(x,\delta)_i \sqsubseteq \sigma(\ell_0,\delta)\}}$$

$$\dfrac{\delta \vdash [\![e]\!]^{\ell_0} \rightsquigarrow C_0}{\delta \vdash [\![\text{match } e^{\ell_0} \text{ with } \overline{p_i \rightarrow e_i^k}]\!]^\ell \rightsquigarrow C_0 \cup \text{pat}_\delta\, \ell_0 : \overline{p_i \rightarrow e_i^k} \Rightarrow \ell}$$

$$\dfrac{\delta \vdash [\![e]\!]^{\ell'} \rightsquigarrow C \quad \text{cn}_\delta^{\kappa^{-1}} \ell' \Rightarrow \ell}{\delta \vdash [\![\kappa^{-1}(e)]\!]^\ell \rightsquigarrow C \cup \text{cn}_\delta^{\kappa^{-1}} \ell' \Rightarrow \ell} \qquad \dfrac{e \in \sigma(\ell',\delta)}{\text{cn}_\delta^{\kappa^{-1}} \ell' \Rightarrow \ell \rightsquigarrow \kappa^{-1}(e) \in \sigma(\ell,\delta)}$$

$$e_0 \in \sigma(\ell_0,\delta) \qquad r_i = \begin{cases} e_0 = p_i & (i=1) \\ e_0 = p_i \wedge \bigwedge_{1 \le j \le i} e_0 \ne p_j & (o.w.) \end{cases}$$

$$\delta \wedge r_1 \vdash e_1 \rightsquigarrow C_1$$
$$\delta \wedge r_2 \vdash e_2 \rightsquigarrow C_2$$
$$\dots$$
$$\delta \wedge r_k \vdash e_k \rightsquigarrow C_k$$

$$C_{FV} = \bigcup_{1 \le i \le k} \{\sigma(x,\delta) \sqsubseteq \sigma(x, \delta \wedge r_i) \mid x \in FV(e_i)\}$$

$$C_{LJ} = \bigcup_{1 \le i \le k} \{\sigma(\ell_i, \delta \wedge r_i) \sqsubseteq \sigma(\ell,\delta)\}$$

$$\text{pat}_\delta\, \ell_0 : \overline{p_i \rightarrow e_i^k} \Rightarrow \ell \rightsquigarrow \bigcup_{1 \le i \le k} C_k \cup C_{FV} \cup C_{LJ} \cup \bigcup_{1 \le i \le k, p_i = \kappa(x_1,\dots,x_n)} \{\kappa^{-1}(e_0) \in \sigma(x_j,\delta) \mid 1 \le j \le n\}$$

FIG. 3

$$\dfrac{}{[\![n_1, n_2]\!] \leadsto \varnothing} n_1 = n_2 \qquad \dfrac{}{[\![x_1^{l_1}, x_2^{l_2}]\!] \leadsto \{\text{Modify}(l_1, \square_{\text{type}(l_2)}^{l_2})\}} \qquad \dfrac{[\![e_1, e_2]\!] \leadsto T}{[\![(\lambda x_1.e_1), (\lambda x_2.e_2)]\!] \leadsto T} \qquad \dfrac{[\![e_1, e_1']\!] \leadsto T_1 \quad [\![e_2, e_2']\!] \leadsto T_2}{[\![(e_1\, e_2), (e_1'\, e_2')]\!] \leadsto T_1 \cup T_2}$$

$$\dfrac{[\![e_0, e_0']\!] \leadsto T_0 \quad \begin{array}{l} T_I = \{\text{Insert}(l, p_j \to \overline{a_e(e_j)}) \mid 1 \leq j \leq m,\, a_p(p_j) \in \{a_p(p_i')\}_{i=1}^{n} \setminus \{a_p(p_j)\}\} \\ T_D = \{\text{Delete}(l, p_j \to e_j) \mid 1 \leq j \leq n,\, a_p(p_j) \in \{a_p(p_i')\}_{i=1}^{n} \setminus \{a_p(p_i')\}_{i=1}^{m}\} \\ T_M \cup \{T_j \mid 1 \leq j \leq k,\, [\![e_j, e_j']\!] \leadsto T_j,\, a_p(p_j) = a_p(p_j')\} \end{array}}{[\![(\text{match } e_0 \text{ with } \overline{p_i \to e_i^n}),\, (\text{match } e_0' \text{ with } \overline{p_i' \to e_i'^m})]\!] \leadsto T_0 \cup T_M \cup T_I \cup T_D}$$

$$\dfrac{[\![e_1, e_1']\!] \leadsto T_1 \,\cdots\, [\![e_k, e_n']\!] \leadsto T_n}{[\![\kappa(e_1, \ldots, e_n), \kappa(e_1', \ldots, e_n')]\!] \leadsto \bigcup_{1 \leq i \leq n} T_i} \qquad \dfrac{}{[\![e_1^{l_1}, e_2^{l_2}]\!] \leadsto \{\text{Modify}(l_1, a_e(e_2))\}} \; (e_1 \text{ and } e_2 \text{ are of different kinds.})$$

Input: A buggy submission $P_b$, a set of correct submissions $\mathcal{P}_c$, and a set of test cases $\mathcal{T}$
Output: A program $P_c$ satisfying all the test cases in $\mathcal{T}$ 1: $\mathcal{A} \leftarrow \emptyset$       ▷ Set of edit actions
2: $\mathcal{P} \leftarrow \mathcal{P}_c \cup \{P_b\}$
3: $\sigma \leftarrow$ result of the path-sensitive 0CFA on $\mathcal{P}$
4: $\Delta \leftarrow$ all calling contexts derivable from $\sigma$
5: Derive $\mathcal{M}$ from $\Delta$       ▷ $\mathcal{M}$ : Fid → Fid
6: $\mathcal{T} \leftarrow$ ExtractTemplates($\mathcal{M},\Delta,P_b,\mathcal{P}_c$)
7: for $T \in \mathcal{T}$ do
8:     $\mathcal{A} \leftarrow \mathcal{A} \cup$ InstatiateTemplate(T, $P_b$, $\sigma$)
9: $n \leftarrow 1$
10: repeat     ▷ E: edit script comprising n edit actions
11:    for each permutation E of n elements of $\mathcal{A}$ do
12:       P ← apply E into $P_b$
13:       if correct(P, $\mathcal{T}$) then
14:          return P
15:    n ← n + 1
16: until n ≤ $|\mathcal{A}|$

[FIG. 6]
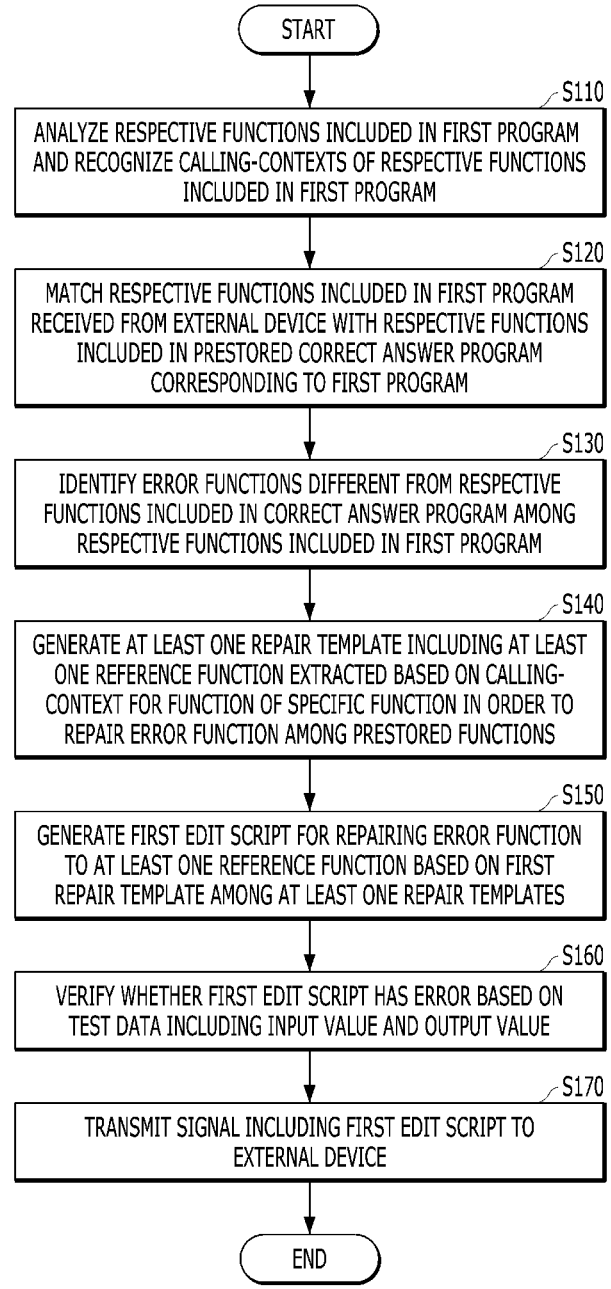

[FIG. 7]
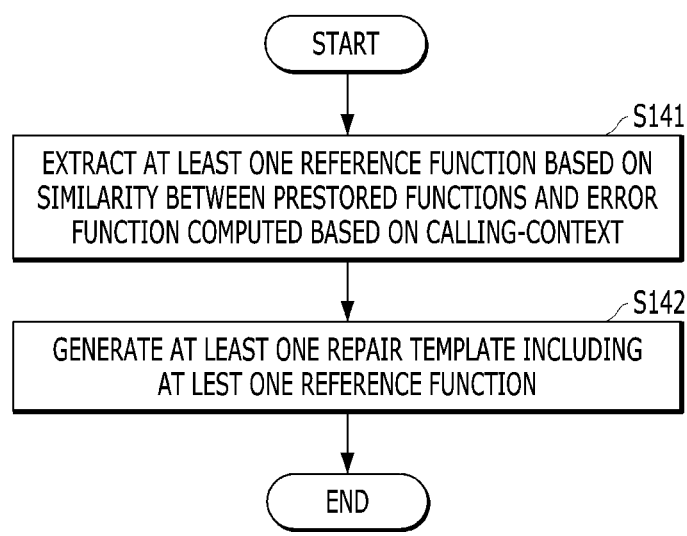

[FIG. 8]
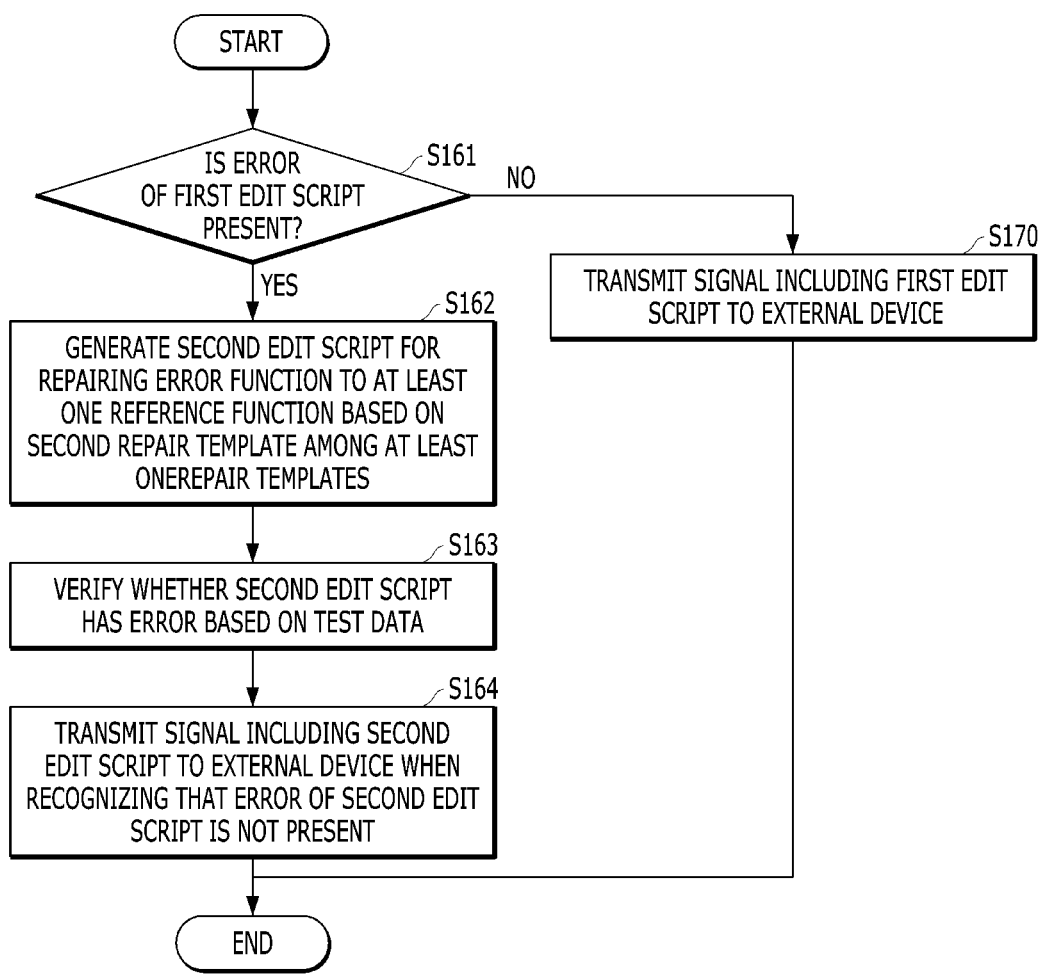

FIG. 9

[FIG. 10]
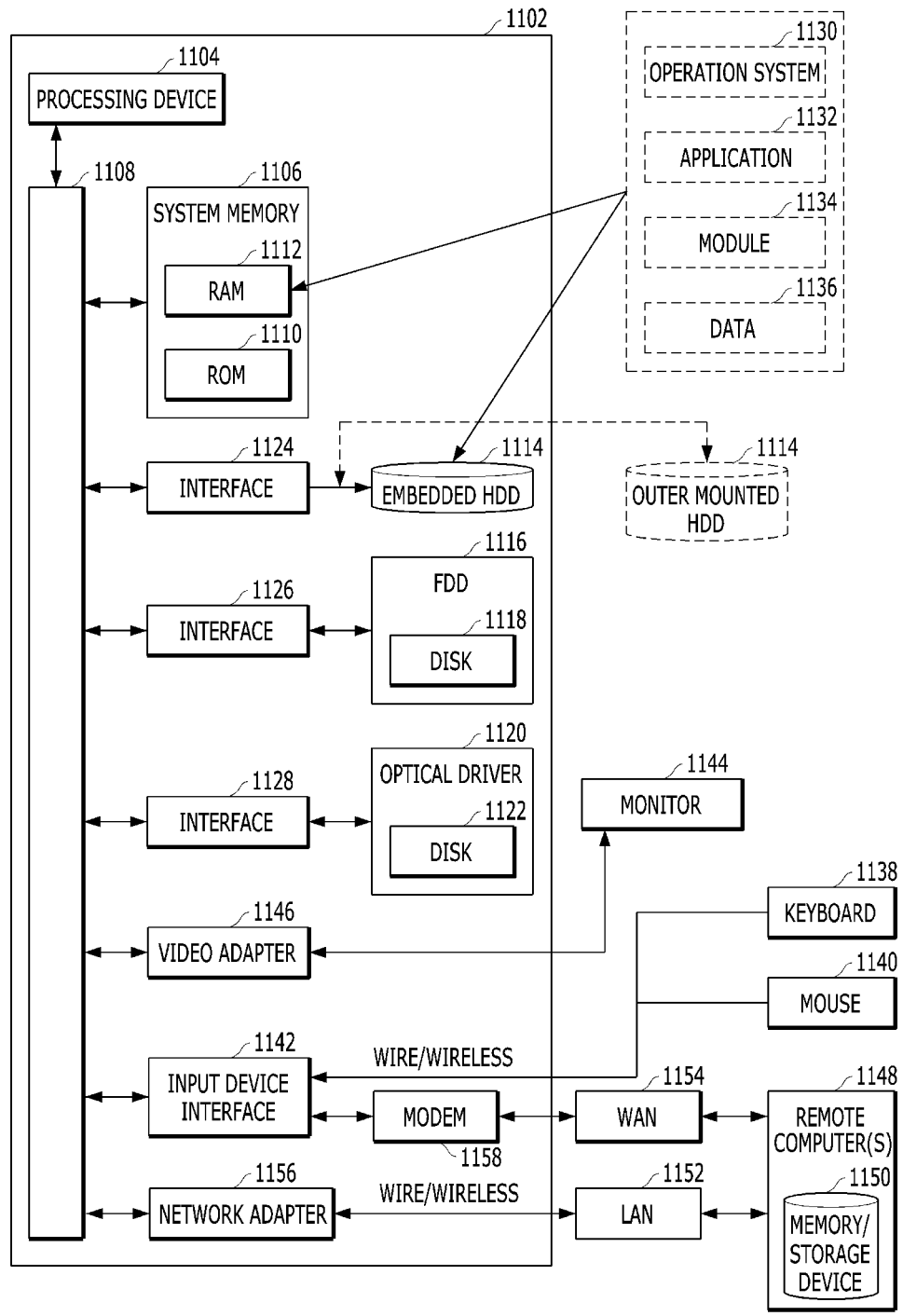

METHOD FOR FEEDBACK OF PROGRAM

CROSS REFERENCE TO RELATED APPLICATIONS

This application claims the benefit under 35 USC 119(a) and 365(b) of Korean Patent Application No. 10-2021-0132462, filed on Oct. 6, 2021 in the Korean Intellectual Property Office, the entire disclosure of which is incorporated herein by reference for all purposes.

TECHNICAL FIELD

The present disclosure as a method for feedback of a program relates to automatic feedback generation which is one of the applications of an automatic program repair technique in a programming language field and a software engineering field. More particularly, the present disclosure relates to a data-driven feedback generation technique that provides a feedback of repairing a program including an error based on a calling-context.

BACKGROUND ART

An automatic program repair technique means a technique that receives a program with an error and a specification with which the corresponding program should satisfy as an input and automatically repairs the error so that a given program satisfies the input specification. In recent years, resources required for debugging that finds and repairs a bug of the program in a software development process has gradually increased while complexity of the software has increased rapidly. In particular, since the debugging entirely depends on manual work of a developer, a lot of time is consumed and a mistake is also easily made. The automatic program repair technique as a solution for enhancing software productivity by automating such a debugging process is emerging in program language and software engineering fields.

A scale of a software industry becomes bigger, and an interest in a programming education is also gradually increasing. However, compared to a rapidly increasing demand for the programming education, a current quality of the programming education cannot satisfy the demand. In particular, it is realistically almost impossible for a small number of educators to give individual feedbacks to a large number of students. It is insufficient to just provide a correction answer program created by the educator as a feedback. In general, the reason is that since the students are not good at programming, codes created by the students are very often different from a model answer of the educator. In other words, the most important thing in providing the feedback on a programming task is to provide the feedback by creating a correct answer program through minimal repairing while maximally maintaining a prototype of the code created by the student. In order to solve the problem, in recent years, an automatic feedback generation technique is emerging which automatically announces for which part students make a mistake and how to correct the part by applying an automatic program repairing technique to a task program of the students.

Initial automatic feedback generation techniques are a semi-automatic scheme requiring efforts of the educator in order to generate the feedback. For example, AutoGrader regarded as the initial automatic feedback technique requires an error correction model which the educator defines manually in order to repair an incorrect answer program. CoderAssist generates a feedback of which correctness is ensured by utilizing the correct answer program, but still has a problem in that the educator should examine whether the correct answer program utilized for generating the feedback is correct manually. In order to solve the problem, FixML and sk_p overcome a limit of the existing feedback generation technique by utilizing a program synthesis technique and a language model, respectively, and generate the feedback by a completely automated scheme without intervention of a person. However, since the techniques aim at repairing only one error in the program, the techniques still have a limit that the techniques well operate only in a comparatively small task program and feedback generation rate is low.

A recent mainstream of the automatic feedback generation technique is a data-driven feedback generation technique that repairs an incorrect answer by utilizing a lot of correct answer programs submitted by the students. CLARA and SARFGEN provide a feedback by repairing the incorrect answer by finding one correct answer program similar to a given incorrect answer by using a syntactic comparison. The data-driven feedback generation techniques prove effectiveness in a programming task having a simple difficulty, but has a limit of well operating only when a reference program having an almost matching syntax with the incorrect answer in a correct answer data set. In particular, when the difficulty of the programming task is difficult and a program to be created is complicated, there is a problem in that it is difficult to find the reference program.

SUMMARY OF THE INVENTION

The present disclosure has been made in an effort to provide a data-driven feedback generation technique providing a feedback of repairing a program including an error based on a calling-context.

However, technical objects of the present disclosure are not restricted to the technical object mentioned above. Other unmentioned technical objects will be apparently appreciated by those skilled in the art by referencing to the following description.

An exempalry embodiment of the present disclosure provides a method for feedback of a program, which is performed by a computing device including at least one processor, which may include: matching respective functions included in a first program received from an external device with respective functions included in a prestored correct answer program corresponding to the first program; identifying error functions different from the respective functions included in the correct answer program among the respective functions included in the first program; generating at least one repair template including at least one reference function extracted based on a calling-context for a function of a specific function in order to repair the error function among the prestored functions; generating a first edit script for repairing the error function to the at least one reference function based on a first repair template among the at least one repair templates; and transmitting a signal including the first edit script to the external device.

Alternatively, the method may further include verifying whether the first edit script has an error based on test data including an input value and an output value before transmitting of the signal including the first edit script to the external device.

Alternatively, the transmitting of the signal including the first edit script to the external device may include transmitting the signal including the first edit script to the external device when recognizing that the error of the first edit script is not present based on the test data.

Alternatively, the method may include: when recognizing that the error of the first edit script is present based on the test data, generating a second edit script for repairing the error function to the at least one reference function based on a second repair template among the at least one repair templates; verifying whether the second edit script has the error based on the test data; and transmitting a signal including the second edit script to the external device when recognizing that the error of the second edit script is not present.

Alternatively, the calling-context may include a path condition of an input variable when the specific function is called.

Alternatively, the method may further include recognizing the calling-context of each of the functions included in the first program by analyzing the respective functions included in the first program before matching of the respective functions included in the first program received from the external device with respective functions included in the correct answer program corresponding to the first program.

Alternatively, the generating of the at least one repair template may include extracting the at least one reference function based on a similarity between the prestored functions and the error function computed based on the calling-context, and generating the at least one repair template including the at least one reference function.

Alternatively, the specific function may include at least one of the respective functions included in the first program, the respective functions included in the prestored correct answer program, and the presorted functions.

Alternatively, the generating of the at least one repair template may include when recognizing that the calling-context of the specific function is not present, generating the calling-context of the specific function by using calling-context tunneling.

Alternatively, the generating of the calling-context of the specific function may include when recognizing that the calling-context of the specific function is not present, generating a calling-context of a caller who calls the specific function to the calling-context of the specific function.

Another exemplary embodiment of the present disclosure provides non-transitory computer readable medium including a computer program, wherein the computer program executes a method for feedback of a program when the computer program is executed by one or more processors, in which the method may include: matching respective functions included in a first program received from an external device with respective functions included in a prestored correct answer program corresponding to the first program; identifying error functions different from the respective functions included in the correct answer program among the respective functions included in the first program; generating at least one repair template including at least one reference function extracted based on a calling-context for a function of a specific function in order to repair the error function among the prestored functions; generating a first edit script for repairing the error function to at least one reference function based on a first repair template among one or more repair templates; and transmitting a signal including the first edit script to the external device.

Yet another exemplary embodiment of the present disclosure provides a computing device for feedback of a program, which may include: a processor including at least one core; and a memory including program codes executable by the processor, in which the processor may be configured to match respective functions included in a first program received from an external device with respective functions included in a prestored correct answer program corresponding to the first program, identify error functions different from the respective functions included in the correct answer program among the respective functions included in the first program, generate at least one repair template including at least one reference function extracted based on a calling-context for a function of a specific function in order to repair the error function among the prestored functions, generate a first edit script for repairing the error function to at least one reference function based on a first repair template among one or more repair templates, and transmit a signal including the first edit script to the external device.

According to an exemplary embodiment of the present disclosure, by overcoming a limit of an existing data-driven feedback generation technique using a syntax comparison, an accurate feedback can be provided even to a complicated programming task constituted by multiple functions.

According to an exemplary embodiment of the present disclosure, a feedback can be rapidly and accurately provided with respect to questions requested by a lot of users in a programming education service by providing a feedback of repairing a program including an error based on a calling-context.

The present disclosure can be used even in a general software industry in addition to a short programming task program. Therefore, this is utilized and extended, and as a result, a debugging process is automated in a software industry to reduce cost required for debugging and enhance a quality of software.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

FIG. 1 is a diagram for describing an example of a system for feedback of a program according to some exemplary embodiments of the present disclosure.

FIG. 2 is a block diagram of a computing device for feedback of a program according to some exemplary embodiments of the present disclosure.

FIG. 3 is a diagram illustrating a constraint generation rule performed by the computing device for feedback of a program according to some exemplary embodiments of the present disclosure.

FIG. 4 is a diagram illustrating a process of generating a repairing template, which is performed by the computing device for feedback of a program according to some exemplary embodiments of the present disclosure.

FIG. 5 is a diagram illustrating an algorithm performed by the computing device for feedback of a program according to some exemplary embodiments of the present disclosure.

FIGS. 6 to 8 are flowcharts illustrating a method for feedback of a program, which is performed by the computing device according to some exemplary embodiments of the present disclosure.

FIG. 9 is a diagram illustrating programs used in a process of feedback of a program, which is performed by the computing device according to some exemplary embodiments of the present disclosure.

FIG. 10 is a schematic view of a computing environment according to some exemplary embodiments of the present disclosure.

DETAILED DESCRIPTION

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an exemplary embodiment disclosed in the present disclosure, a detailed description of related known technologies will be omitted if it is determined that the detailed description makes the gist of the exemplary embodiment of the present disclosure unclear. Further, the accompanying drawings are only for easily understanding the exemplary embodiment disclosed in this specification and the technical spirit disclosed by this specification is not limited by the accompanying drawings.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

In addition, the word "comprises" and/or "comprising" means that the corresponding feature and/or component is present, but it should be appreciated that presence or addition of one or more other features, components and/or a group thereof is not excluded. Further, when not separately specified or it is not clear in terms of the context that a singular form is indicated, it should be construed that the singular form generally means "one or more" in this specification and the claims.

In addition, the term "at least one of A or B" should be interpreted to mean "a case including only A", "a case including only B", and "a case in which A and B are combined".

It should be understood that, when it is described that a component is "connected to" or "accesses" another component, the component may be directly connected to or access the other component or another component may be present therebetween. In contrast, it should be understood that, when it is described that a component is "directly connected to" or "directly access" another component, no component is present between the component and another component.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

A method for feedback of a program according to some exemplary embodiments of the present disclosure may mean data-driven feedback generation technique that provides a feedback of repairing a program including an error based on a calling-context. However, the present disclosure is not limited thereto.

In the method for feedback of a program according to some exemplary embodiments of the present disclosure, a unique label may be allocated to each of one or more expressions included in the program. For example, when a number $l \in L$ is allocated to any expression e, this may be denoted by $\in^l$. In addition, when the number of the expression is not required, l may be omitted. Further, when two expressions are compared, the numbers of the corresponding expressions may be disregarded and only whether the syntaxes of two equations are the same as each other may be checked. Specifically, the expression may be shown in [Equation 1] below.

Equation 1

| $e \in Exp$ | (Expressions) | $x \in VId$ | (Variables) |
|---|---|---|---|
| $f \in FId$ | (Functions) | $Id = VId \cup FId$ | (Identifiers) |
| $e \in Label$ | (Labels) | $\tau \in Type$ | (Types) |

$e ::= n \mid x \mid \lambda x.e \mid e_1 \oplus e_2 \mid e_1\ e_2 \mid k(e_1, \ldots, e_{a(k)})$
$\quad \mid k^{-i}(e) \mid let\ x = e_1\ in\ e_2 \mid let\ rec\ f(x) = e_1\ in\ e_2$
$\quad \mid match\ e\ with\ \overline{p_i \to e_i}^k,$
$p ::= k(x_1, \ldots, x_n) \mid \_\ \tau ::= int \mid T \mid \tau_1 \to \tau_2$ Here, the expression $\in$ may include a constant n, a variable x, an anonymity function $\lambda x.e$, a transposition operator $e_1 \oplus e_2$, a function call $e_1$ $e_2$, a data type generator $k(e_1, \ldots, e_{\alpha(k)})$, an i-th factor $\kappa^{-i}(e)$ of data type k, variable define (let $x=e_1$ in $e_2$), function define (let rec $f(x)=e_1$ in $e_2$), and pattern matching (match ε with $\overline{p_i \to e_i^k}$). $\alpha(k)$ may be an arity of a factor of a defined data type generator K.

$\overline{p_i \to e_i^k}$ may be used for concisely expressing pattern matching $p_1 \to e_1 | \ldots | p_k \to e_i$. A pattern p may include at least one of a data type I and a wildcard pattern _. The type of expression in the corresponding language may be constituted by an integer type int, a user defined data type T, and a function type $\tau_1 \to \tau_2$.

In addition, → in a notation for the expression may be standardized execution semantics of the above defined language. For example, all sub expressions of one expression e may be described as sub(e). |e| may be a size of the expression e. A set of all function identifiers which are present inside the expression e may be notated as function (e) (e.g., function(e)={$f \in$Fid|let rec $f(x)=e_1$ in $e_2 \in$sub(e)}). Further, the function may receive only one argument as an input, and may not be mutually recursive. However, the present disclosure is not limited thereto, and the function may receive a plurality of arguments as the input and may be mutually recursive.

In the method for feedback of a program according to some exemplary embodiments of the present disclosure, a program P∈Exp generated by the user of the external device may not have a type error. The type error may be an error which occurs as another type other than a predetermined type is input into the expression included in the program.

The program p∈Exp generated by the user of the external device may be shown as in [Equation 2] below.

$$\text{let rec } f(x)=e \text{ in } fx_i \qquad \text{[Equation 2]}$$

Here, $f$ may be a target function to be created by the user (e.g., the student) of the external device in the programming task. $x_i$ may be an input variable.

Meanwhile, in the method for feedback of a program according to some exemplary embodiments of the present disclosure, the number of the expression included in the programs and a variable name other than the input variable may be unique. Therefore, in the method for feedback of a program according to some exemplary embodiments of the present disclosure, functions body, param, and type may be used. The body function Fid→Exp may return a body of the specific function. The function param FId→VId may return a parameter of the specific function. The function type (Label ∪ID)→Type may return an expression having a specific number or a type of variable.

Meanwhile, in the method for feedback of a program according to some exemplary embodiments of the present disclosure, when a set of values is Val, a set T⊆Val×Val of the test data may be used for confirming the correct answer of each submission. When the program P generated by the user of the external device satisfies $\forall(i,o) \in T. (\lambda x_p P)i \to^* o$, the program P generated by the user of the external device may be recognized as a correct answer correct(P,T). When the program P generated by the user of the external device does not satisfy $\forall(i,o) \in T. (\lambda x_p P)i \to^* o$, the program P generated by the user of the external device may be recognized as an incorrect answer.

The method for feedback of a program according to some exemplary embodiments of the present disclosure may generate a new correct answer program $P \notin P_e$ by minimally repairing a program $P_b$ generated by the user of the external device by using the program $P_b \in$Exp generated by the user of the external device, the set $P_c \subseteq$Exp of the prestored correct answer program, and the set T of the test data.

Hereinafter, the method for feedback of a program according to some exemplary embodiments of the present disclosure will be described in detail with reference to the drawings.

FIG. 1 is a diagram for describing an example of a system for feedback of a program according to some exemplary embodiments of the present disclosure.

Referring to FIG. 1, a system for feedback of a program may include a computing device 100, an external device 200, and a network. However, components described above are not required in implementing the system for feedback of a program and the system for feedback of a program may thus have components more or less than components listed above.

First, the computing device 100 may communicate with the external device 200 through the network. Therefore, the computing device 100 may receive a program from the external device 200 and transmit, to the external device 200, a signal including a repairing script for repairing the program. A specific configuration of the computing device 100 will be described below with reference to FIG. 2.

FIG. 2 is a block diagram of a computing device for feedback of a program according to some exemplary embodiments of the present disclosure.

Referring to FIG. 2, the computing device 100 may include a processor 110, a memory 130, and a network unit 150. However, components described above are not required in implementing the computing device 100, so the computing device 100 may have components more or less than components listed above.

As described above, the processor 110 may be constituted by one or more cores, and include processors for performing operations related to program feedback, which include a central processing unit (CPU), a general purpose graphics processing unit (GPGPU), a tensor processing unit (TPU), and the like of the computing device 100.

The processor 110 may generally process an overall operation of the computing device 100. The processor 110 processes a signal, data, information, and the like input or output through the components or drives the program stored in the memory 130 to provide or process information or a function appropriate for the user.

Meanwhile, the processor 110 may receive a first program from the external device 200 through the network unit 150. The first program as a set of instructions created by a programming language by a user may mean an incorrect answer program including at least one error. The instruction may mean one action statement which operated in a computer. Further, the programming language may include a functional programming language. The functional programming language as a program creation language that states processing based on application of a function to data may support an algebraic data type and a recursive function. The algebraic data type may be a type defined by using algebraic operations for other sub types. The algebraic data type may include a total type defined as a union of two or more sub types and a product type defined as a sequence of sequencing two or more sub types. The recursive function may mean a function of re-refer to itself.

Meanwhile, the processor 110 analyzes respective functions included in the received first program to recognize calling-contexts of the respective functions included in the first program. The calling-context may relate to a function of a specific function. Specifically, the calling-context may be shown in [Equation 3] below.

$$\langle f, \delta, g \rangle \in Fid \times Ctx \times Fid \qquad \text{[Equation 3]}$$

Here, $f$ may represent a target function, $g$ and $f$ may represent functions called inside a text, and may represent a path condition when function calling is made. In other words, the calling-context may include a path condition $\delta \in Ctx$ of an input variable when the specific function is called. Specifically, the path condition may be a specific condition which should be satisfied to execute the specific function. The path condition of the input variable when the specific function is called may be shown as in [Equation 4] below.

$$\delta ::= \text{true}|\text{false}|e=e|-\delta|\delta\hat{\ }\delta. \qquad \text{[Equation 4]}$$

The processor 110 may perform path-sensitive 0-CFA analysis for the first program in order to analyze the respective functions included in the received first program. The path-sensitive 0-CFA analysis may acquire analysis information for each expression. The analysis information may be a set of result values which respective expressions may potentially have. The result value may be a set of expressions in which the input variable appears as a free variable. Further, the result values may be classified by using the path condition in order to classify analysis results calculated in respective other execution paths. For example, the path-sensitive 0-CFA analysis may calculate a dataflow state $\sigma \in (Id \cup Label) \times Ctx \to \varphi(Exp) \cup \{T\}$. The dataflow state may be a process in which data is changed in the expression included in the program.

Hereinafter, the path-sensitive 0-CFA analysis will be described in detail with reference to the drawing.

FIG. 3 is a diagram illustrating a constraint generation rule performed by the computing device for feedback of a program according to some exemplary embodiments of the present disclosure.

Referring to FIG. 3, $\delta|-[[e]]^{l \leadsto} C$ may mean that an analysis of an expression e having a number l generates a constraint C set due to the dataflow state $\sigma$ in a current path condition $\delta$. The constraint may be computed by using a least-fix point computation. A specific constraint (e.g., fn, cn, pat, etc.) generated in the process of computing the constraint through the least-fix point computation may be interpreted by using a constraint programming (constraint solver), and then an additional constraint may be generated by referring an intermediate analysis result. For example, a specific constraint $fn_\delta l_1:l_2 \to l$ may transfer a value to a formal parameter x in an actual factor having an $l_2$-th number with respect to all function expressions $\lambda x.e_0^{l_0}$ which may be derived from an expression having an $l_1$-th number, and generate an additional constraint for showing a dataflow transferred from an actual result of an actual function call statement of an l-th number. In order to ensure the end of the analysis, when analysis results of a specific expression become more than a given maximum threshold, the analysis results may be converted into $\tau$ by using a widening operator. Meanwhile, the constraint programming may be used for finding a solution which may satisfy at least constraint. The constraint programming may include variables of the expression, domains setting boundaries for available values for the respective variables, and constraints of the expression.

In the present disclosure, a method for recognizing the calling-context of the function by using 0-CFA performed by the processor 110 may not influence correctness of an entire algorithm to be described below. A difference of the method for recognizing the calling-context may influence effectiveness of context-driven matching.

After the path-sensitive 0-CFA analysis ends, the processor 110 may extract the calling-context by using the corresponding result. Specifically, the processor 110 may compute a constraint $C_i$ and a least solution $\sigma_i$ satisfying $\text{true}\vdash [[P_i]]^{l_i \leadsto} C_i$ in each program with respect to a plurality of programs $P_1^{l_1}, \ldots, P_m^{l_m}$ including the first program received from the external device 200. The processor 110 computes a set $\Delta = \Delta_1 \cup \ldots \cup \Delta_m$ of the calling-context by utilizing a constraint $C_i$ and a least solution $\sigma_i$ satisfying $\text{true}|-[[P_i]]^{l_i \leadsto} C_i$ in each program. Here, each set may be shown as in [Equation 5] below.

$$\bigcup_{\substack{f \in functions(P_i) \\ \delta \in Ctx}} \{\langle f, \delta, g \rangle \mid (e_1^{\ell_1}\ e_2) \in Sub(\text{body}(f)), \qquad \text{[Equation 5]}$$

$$g \in \sigma_i(\ell_1, \delta)\}.$$

The processor 110 may compute a result $$\sigma = \bigsqcup_{i=1}^{m} \sigma_i$$

acquired by adding analysis results computed by the plurality of programs including the first program received from the external device 200 to be used for the algorithm afterwards.

Referring back to FIG. 2, the processor 110 may match the respective functions included in the first program received from the external device with respective functions included in a prestored correct answer program corresponding to the first program.

The processor 110 may identify error functions different from the respective functions included in the correct answer program among the respective functions included in the first program.

The processor 110 may generate at least one repairing template including at least one reference function extracted based on the calling-context for the function of the specific function in order to repair the error function among the prestored functions. The specific function may include at least one of the respective functions included in the first program, the respective functions included in the prestored correct answer program, and the presorted functions.

Specifically, the processor 110 may extract at least one reference function based on a similarity between the prestored functions and the error function calculated based on the calling-context. For example, the processor 110 may calculate the similarity based on a distance between two functions $f$ and $g$. The distance between two functions $f$ and $g$ may be shown as in [Equation 6] below.

$$\text{dist}(f, g) = w_1 \times |CC_{in}^{f,g}|^{-1} + w_2 \times |CC_{out}^{f,g}|^{-1} \qquad \text{[Equation 6]}$$

Here, constants $w_1$ and $w_2$ may be weight values learned statistically. $CC_{in}^{f,g}$ may be a set of comparable incoming calling-contexts. $CC^{f,g_{out}}$ may be a set of comparable outgoing calling-contexts. $CC_{in}^{f,g}$ and $CC^{f,g_{out}}$ may be shown as in [Equation 7] below.

$$CC_{in}^{f,g} = \{(\delta, \delta') | \delta, \delta' \in Ctx, \langle\ , \delta, f\rangle, \langle\ , \delta', g\rangle \in \Delta, \text{SAT}(\delta\hat{\ }\delta')\}$$

$$CC_{out}^{f,g} = \{(\delta, \delta') | \delta, \delta' \in Ctx, \langle\ , \delta, f\rangle, \langle\ , \delta', g\rangle \in \Delta, \text{SAT}(\delta\hat{\ }\delta')\}$$

When calling-contexts which come in two functions $f$ and $g$, respectively are not present, the processor 110 may not consider $CC^{f,g_{in}}$. Further, when calling-contexts which go out to two functions $f$ and $g$, respectively are not present, the processor 110 may not consider $CC^{f,g_{out}}$. Here, two functions being further similar may mean that the distance between two functions becomes short.

The processor 110 may extract the reference function for repairing the error function among the prestored functions based on the distance between two functions $f$ and $g$. A function for extracting the reference function for repairing the error function among the prestored functions based on the distance between two functions $f$ and $g$ may be shown as in [Equation 8] below.

$$\mathcal{M} = \lambda P_b \cdot \{f \mapsto \operatorname*{argmin}_{\substack{P_c \in \mathcal{P}_c \\ g \in \text{functions}(P_c) \\ \text{type}(f) = \text{type}(g)}} \text{dist}(f, g) \mid f \in \text{functions}(P_b)\}. \quad \text{[Equation 8]}$$

When candidates having the same distance from one function are present, the processor 110 may select a function having a higher syntactic similarity among the corresponding functions. Specifically, the processor 110 may measure the syntactic similarity through a similarity measurement method based on position-aware characteristic vector conversion.

Further, the processor 110 may generate at least one repair template including at least one reference function. The processor 110 may generate at least one edit script (e.g., a first edit script, a second edit script, etc.) for repairing the error function to at least one reference function based on any one repair template (e.g., a first repair template, a second repair template, etc.) among one or more repair templates. The repair template may include at least one hole into which the variable is input. The edit script may be a set of edit actions generated based on the repair template. The edit action may be a template generated by inputting the variable into the hole included in the repair template.

Specifically, the edit action may include at least one of Modify(l,e), Insert (l,p→e), Delete(l,p→e), and Define($f$). Modify(l,e) may modify an expression at an l-th position to a new expression e. Insert(l,p→e) may insert a new pattern into an l-th pattern match expression. Delete(l,p→e) may remove a pattern match(p→e) from the l-th pattern match expression. Define($f$) may define a new function $f$. For example, a result of applying the corresponding template Define($f$) to the expression ε may be expressed as in "let rec $f$ (param($f$))=body($f$) in ε".

Specifically, the processor 110 may generate the edit script by transforming the template (e.g., Modify, Insert, etc.) including at least one hole into which the variable is input. At least one hole may include a specific type and may be substituted with a specific type of variable. An expression $\text{Exp}_0$ including at least one hole may be shown as in [Equation 9] below.

Equation 9

$e_\square \in \text{Exp}_\square$
$e_\square ::= \square_\tau \mid n \mid \lambda x.e_\square \mid e_{\square,1} \oplus e_{\square,2} \mid e_{\square,1} \, e_{\square,2}$
$\quad \mid k(e_{\square,1}, \ldots, e_{\square,a(k)}) \mid k^{-i}(e_\square)$
$\quad \mid \text{let } x = e_{\square,1} \text{ in } e_{\square,2}$
$\quad \mid \text{let rec } f(x) = e_{\square,1} \text{ in } e_{\square,2}$ Equation 9

$\quad \mid \text{match } e_\square \text{ with } \overline{p_{\square,i} \to e_{\square,i}}^k,$
$p_\square ::= k(\square_{\tau 1}, \ldots, \square_{\tau k}) \mid \_$

[Equation 9] is an equation in which the hole is added to [Equation 1] described above, and a detailed description may be substituted with the description of [Equation 1] described above.

The processor 110 may interpret one expression having the hole as a form in which multiple expressions are abstracted. An abstraction function $\alpha_e : \text{Exp} \to \text{Exp}_\alpha$ used for extracting the template from the correct answer program may be shown as in [Equation 10] below.

$$\alpha_e(n) = n \quad \text{[Equation 10]}$$

$$\alpha_e(x^\ell) = \square_{\text{type}(x)}^\ell$$

$$\alpha_e(\lambda x.e) = \lambda x.\alpha_e(e)$$

$$\ldots$$

$$\alpha_e(\text{match } e \text{ with } \overline{p_i \to e_i}^k) = \text{match } \alpha_e(e) \text{ with } \overline{p_i \to \alpha_e(e_i)}^k$$

$$\alpha_p(\kappa(x_1, \ldots, x_{a(\kappa)})) = \kappa(\alpha_e(x_1), \ldots, \alpha_e(x_{a(\kappa)})) \quad \alpha_p(\_) = \_$$

The processor 110 may generate a template set $T = T_D \cup T_M$ based on the program P (e.g., the first program) generated by the user of the external device 200 and the function M for extracting the reference function for repairing the error function. Here, $T_D$ as a set of templates related to template Define may be a set of one or more auxiliary functions used in the correct answer program. $T_D$ may be shown as in [Equation 11] below.

$\mathcal{T}_D = \{\text{Define}(g) \mid f \in \text{functions}(P), g \in \text{callees}(\text{body}($
$\quad \mathcal{M}(f)))\}.$ [Equation 11]

Here, a function (callee: Exp→FId) may return a set of all functions called in an input expression.

Further, $T_M$ may be a set including the templates Modify, Insert, and Delete. $T_M$ may be shown as in [Equation 12] below.

$\mathcal{T}_M = \cup \{T \mid f \in \text{functions}(P), [[\text{body}(f), \text{body}(\mathcal{M}(f)),$
$\quad \text{body}(\mathcal{M}(f))]] \rightsquigarrow T\}.$ [Equation 12]

Meanwhile, a method for generating at least one repair template including at least one reference function based on the equations by the processor 110 will be described below with reference to FIG. 4.

FIG. 4 is a diagram illustrating a process of generating a repairing template, which is performed by the computing device for feedback of a program according to some exemplary embodiments of the present disclosure.

Referring to FIG. 4, a symbol $[[e,e']] \rightsquigarrow T$ may mean generating a set T of one or more repair templates which may be used for repairing the error of the expression e having the error from a difference between the expression e having the error and an expression e' of the reference function.

Referring back to FIG. 2, the processor 110 may generate the edit action by inputting the variable into the hole included in the repair template generated based on a concretization function $(T_\varepsilon^P : \text{Exp}_{\gamma 2} \to \wp(\text{Exp}))$ parameterized to the program generated by the user of the external device 200. The concretization function may be shown as in [Equation 13] below.

$$\gamma_e^P(n) = \{n\} \quad \gamma_e^P(\lambda x.e_\square) = \qquad \text{[Equation 13]}$$

$$\{\lambda x.e \mid e \in \gamma_e^P(e_\square)\} \ldots \gamma_e^P(\text{match } e_{\square,0} \text{ with } \overline{p_i \to e_{\square,i}}^k) =$$

$$\{\text{match } e_0 \text{ with } \overline{p_i \to e_i}^k \mid e_i \in \gamma_e^P(e_{\square,i})\}$$

Here, $r_e^P$ may be shown as in [Equation 14] below.

$$\gamma_e^P(\square_\tau^\ell) = \begin{cases} \{x \in V \mid \text{type}(x) = \tau\} & (\exists x \in V.\text{type}(x) = \tau) \\ V & (\text{otherwise}) \end{cases} \quad \text{[Equation 14]}$$

Here, V as $\text{vars}(P) \cup \{x \in \text{FId} \mid \delta \in \text{Ctx}.x \in \sigma(1,\delta)\text{RIGHT}\}$ may be a set of one or more variables usable in a given hole $\square_\tau^l$. The processor 110 may generate the number l based on the prestored correct answer program. The processor 110 may recognize the variable in the program P generated by the user of the external device 200 and a name of an accessible function in the number l of the prestored correct answer program as the usable variables. The processor 110 may repair the template by using the function included in the prestored correct answer program through the template Define. Specifically, the processor 110 may generate the edit action by using the function included in the prestored correct answer program through the template Define. The processor 110 may input a variable corresponding to the type of corresponding hole in the concretization function $r_e^P$. The processor 110 may enumerate one or more variables included in V when the variable corresponding to the type of corresponding hole is not present in the concretization function $r_e^P$.

The processor 110 may calculate an edit script (a set of edit actions, A) based on the concretization function with respect to the program P generated by the user of the external device 200. The edit script (the set of the edit actions, A) may be shown as in [Equation 15] below.

$$\mathcal{A} = \{\text{Modify}(\ell, e) \mid \text{Modify}(\ell, e_\square) \in \mathcal{T}_M, e \in \gamma_e^P$$
$$(e_{58})\} \cup \{\text{Insert}(\ell, p \to e) \mid \text{Insert}(\ell, p \to e_\square) \in$$
$$\mathcal{T}_M, e \in \gamma_e^P(e_\square)\} \cup \{\text{Delete}$$
$$(\ell, p \to e) \mid \text{Delete}(\ell, p \to e) \in \mathcal{T}_M\} \cup T_D. \qquad \text{[Equation 15]}$$

However, when the processor 110 calculates the edit script (the set of the edit actions, A) through [Equation 15], the number of edit actions which may be actually generated increases exponentially to the number of given holes, so a calculation speed of the edit script (the set of the edit actions, A) may decrease. Therefore, the processor 110 may use an improved concretization function $\tilde{r}_e^P$ in order to reduce the number of edit actions which may be generated. The improved concretization function $\tilde{r}_e^P$ may be shown as in [Equation 16] below.

$$\tilde{\gamma}_e^P(\square_\tau^\ell) = \begin{cases} V_\tau|_\ell & (V_\tau|_\ell \neq \emptyset) \\ \gamma_e^P(\square_\tau^\ell) & \text{otherwise} \end{cases} \qquad \text{[Equation 16]}$$

Here, the improved concretization function $\tilde{r}_e^P$ may be different from the existing concretization function $r_e^P$ only in the case of [Equation 16] described above, and in other cases, the improved concretization function $\tilde{r}_e^P$ may be defined similarly to the existing concretization function $r_e^P$ by referring to [Equation 13] and [Equation 14] described above.

Further, $V_\tau|_\ell$ may be a set of one or more variables in which a type having the same value among variables which are reachable to the number l is T in the edit script (the set of the edit actions, A). $V_\tau|_e$ may be shown as in [Equation 17] below.

$$V_\tau|_\ell = \{x \in V \mid \text{type}(x) = \tau, \exists \delta, \delta'. \sigma(x, \delta) \cap \sigma(\ell, \delta') \neq \emptyset\}. \qquad \text{[Equation 17]}$$

Meanwhile, the processor 110 may verify whether the first edit script has the error based on test data including an input value and an output value. Specifically, the processor 110 may apply the first edit script to the first program received from the external device, and input the input value of the test data into the first program repaired based on the first edit script. The processor 110 may verify whether the error occurs by comparing a value output from the repaired first program and an output value corresponding to the input value included in the test data. For example, the processor 110 may recognize that the error of the first edit script is not present when the value and the output value are the same as each other as a result of comparing the value output from the repaired first program and the output value corresponding to the input value included in the test data. As another example, the processor 110 may recognize that the error of the first edit script is present when the value and the output value are not the same as each other as a result of comparing the value output from the repaired first program and the output value corresponding to the input value included in the test data.

When the processor 110 recognizes that the error of the first edit script is not present based on the test data, the processor 110 may transmit a signal including the first edit script to the external device 200.

When the processor 110 recognizes that the error of the first edit script is present based on the test data, the processor 110 may generate a second edit script for repairing the error function to at least one reference function based on a second repair template among one or more repair templates. The processor 110 may verify whether the second edit script has the error based on the test data. When the processor 110 recognizes that the error of the second edit script is not present, the processor 110 may transmit a signal including the second edit script to the external device 200.

Meanwhile, the processor 110 may feed back the program based on the algorithm including the above-described contents. Hereinafter, the algorithm including the above-described contents will be described in detail with reference to the drawing.

FIG. 5 is a diagram illustrating an algorithm performed by the computing device for feedback of a program according to some exemplary embodiments of the present disclosure.

Referring to FIG. 5, the processor 110 may acquire an analysis result by performing the 0-CFA analysis with respect to the entire program (line 3). Here, when there is the analysis result for the prestored correct answer program, the processor 110 may acquire the analysis result by performing the 0-CFA analysis for the program received from the external device 200 without analyzing the prestored correct answer program.

The processor 110 may acquire the calling-context through the analysis result (line 4).

The processor 110 may find a matching function M between error functions in a program (an incorrect answer submission, $P_\delta$) generated by the user of the external device 200 through the set of the calling-contexts, and a reference function which will be most useful for repairing the error functions (line 5).

The processor 110 may compute the set T of the repair templates from the found matching function M, and concretize each template and repair the concretized template to the edit action applicable to the program (the incorrect answer submission, $P_{\hat{s}}$) generated by the user of the external device 200 (lines 6 to 8).

The processor 110 may sequentially apply a set of all possible edit actions to the program (the incorrect answer submission, $P_{\hat{s}}$) generated by the user of the external device 200, and find the correct answer (lines 10 to 16). Here, a variable first initialized to 1 may mean the number of used edit actions (line 9).

The processor 110 may apply an edit script which is being searched to the program (the incorrect answer submission, $P_{\hat{s}}$) generated by the user of the external device 200 (line 12), and examine whether to satisfy a test case (line 13).

When the processor 110 finds the correct answer (when the incorrect answer submission to which the edit script is applied satisfies the test case), the processor 110 may return to the edit script as a result (line 14).

When the processor 110 does not find the correct answer (when the incorrect answer submission to which the edit script is applied does not satisfy the test case), the processor 110 may increase the number of used edit actions by one, and then repeat the loop (lines 10 to 16) (line 15). Specifically, when the processor 110 extracts the template Define of adding a new function, the processor 110 does not generate a function call-chain having a length larger than a predetermined length (i.e., which is too long). Therefore, the processor 110 may repeat the loop (lines 10 to 16) by adding only one function. Further, the processor 110 may disregard the edit script which causes the same effect in the process of finding the edit script in the edit action set.

Therefore, since the processor 110 searches the edit script according to an order of a smaller edit script (searches the edit script in an order of the smaller number of edit actions), the processor 110 may continuously ensure generating the feedback by using least edit actions. That is, since the processor 110 finds the correct answer by sequentially applying the edit scripts to the program (the incorrect answer submission, $P_{\hat{s}}$) generated by the user of the external device 200 from the edit script having the smallest number of edit actions, the processor 110 may generate the edit script in which the number of edit actions is the smallest among a plurality of correct answer scripts.

Meanwhile, when the processor 110 recognizes that the calling-context of the specific function is not present, the processor 110 may generate the calling-context of the specific function by using calling-context tunneling. Specifically, when the processor 110 recognizes that the calling-context of the specific function is not present, the processor 110 may generate a calling-context of a caller who calls the specific function as the calling-context of the specific function. Therefore, the processor 110 may prevent inaccurate matching caused due to matching of functions having no calling-context.

Referring back to FIG. 2, the memory 130 may store any type of information generated or determined by the processor 110 and any type of information received by the network unit 150. For example, the memory 130 may store a program (e.g., a first program) received from the external device 200 through the network unit 150.

Further, the memory 130 may store correct answer programs corresponding to the program received from the external device 200. Specifically, the memory 130 may store the path-sensitive 0-CFA analysis result for each of the correct answer programs. Therefore, the processor 110 may additionally perform the path-sensitive 0-CFA analysis only for the program received from the external device 200 and compare the corresponding analysis result with a path-sensitive 0-CFA analysis result for each of the correct answer programs.

In addition the memory 130 may store functions which may be used in the program. Therefore, the processor 110 may extract at least one reference function for repairing an error function included in the program received from the external device 200 among the functions.

The network unit 150 may include an arbitrary wired/wireless communication network which may transmit/receive an arbitrary type of data and signal. For example, the network unit 150 may transmit a signal including an edit script generated by the processor 110 to the external device 200. In addition, the network unit 150 may receive the program (e.g., the first program) from the external device 200.

Referring to back to FIG. 1, the external device 200 may mean an electronic device in which the program may be generated by a user. Specifically, the external device 200 may have a mechanism for communication with the computing device 100 through a network, and may include a PC, a laptop computer, a cellular phone, a smart phone, a laptop computer, a slate PC, a tablet PC, an ultrabook, and a predetermined electronic device.

Further, the external device 200 may transmit the program (e.g., the first program) generated by the user to the computing device 100 through the network. The external device 200 may receive a signal including an edit script (e.g., a first edit script, a second edit script, etc.) from the computing device 100. Here, the external device 200 may check the received edit script, and repair the program generated by the user based on the edit script.

Meanwhile, the network may include an arbitrary wired/wireless communication network which may transmit/receive an arbitrary type of data and signal. Specifically, the network may include a wireless communication network capable of transmitting/receiving a signal including the program and the edit script between the computing device 100 and the external device 200.

Referring to FIGS. 1 to 5, the related art (e.g., SARFGEN) matches the function based on the form of the function itself, i.e., the function syntax, but the related is different from the method for feedback of the program, which is performed by the computing device according to some exemplary embodiments of the present disclosure in that the processor 110 of the computing device 100 extracts the reference function through the calling-context by using the 0-CFA analysis.

Therefore, the method for feedback of the program, which is performed by the computing device according to some exemplary embodiments of the present disclosure overcomes a limit of an existing data-driven feedback generation technique using a syntax comparison to provide an accurate feedback even to a complicated programming task constituted by multiple functions.

Further, the present disclosure can provide a feedback rapidly and accurately with respect to questions requested by a lot of users in a programming education service by providing a feedback of repairing a program including an error based on a calling-context.

Further, the present disclosure can be used even in a general software industry in addition to a short programming task program. Therefore, this is utilized and extended, and as a result, a debugging process is automated in a software industry to reduce cost required for debugging and enhance a quality of software.

Next, a method for feedback of a program according to some exemplary embodiments of the present disclosure will be described below with reference to FIGS. 6 to 8.

FIGS. 6 to 8 are flowcharts illustrating a method for feedback of a program, which is performed by the computing device according to some exemplary embodiments of the present disclosure.

Referring to FIG. 6, the processor 110 analyzes respective functions included in a first program received from an external device to recognize calling-contexts of the respective functions included in the first program (S110).

Specifically, the processor 110 may recognize whether an analysis result for a prestored correct answer program is present.

In addition, when the processor 110 recognizes that the analysis result for the prestored correct answer program is present, the processor 110 analyzes respective functions included in the first program to recognize calling-contexts of the respective functions included in the first program.

When the processor 110 recognizes that the analysis result for the prestored correct answer program is not present, the processor 110 analyzes the respective functions included in the first program and the respective functions included in the prestored correct answer program to recognize calling-contexts of the respective functions included in the first program and the respective functions included in the prestored correct answer program.

The processor 110 may match the respective functions included in the first program received from the external device 200 with respective functions included in a prestored correct answer program corresponding to the first program (S120).

Specifically, the processor 110 may match the respective functions included in the first program and the respective functions included in the prestored correct answer program corresponding to the first program by comparing positions, functions, etc., of the respective functions.

The processor 110 may identify error functions different from the respective functions included in the correct answer program among the respective functions included in the first program (S130).

Specifically, the processor 110 may compare the positions, the function, etc., of the respective functions included in the first program and the respective functions included in the prestored correct answer program corresponding to the first program and when the positions, the functions, etc., of the matched functions are different from each other, the processor 110 may recognize the function included in the first program as the error function.

The processor 110 may generate at least one repairing template including at least one reference function extracted based on the calling-context for the function of the specific function in order to repair the error function among the prestored functions (S140).

Specifically, a process of generating the repair template will be described below with reference to FIG. 7.

Referring to FIG. 7, the processor 110 may extract at least one reference function based on a similarity between the prestored functions and the error function calculated based on the calling-context (S141).

Specifically, the processor 110 may extract a reference function for repairing the error function among the prestored functions based on a distance between the prestored functions and the error function calculated based on the calling-context. Here, the processor 110 may calculate the distance between the prestored functions and the error function through [Equation 6] described above.

Further, when two or more prestored functions having the same distance from the error function are present, the processor 110 may extract the reference function based on a syntactic similarity among the prestored functions having the same distance from the error function.

Specifically, the processor 110 may convert the prestored functions having the same distance from the error function, and the error function into position-driven characteristic vectors. The processor 110 may extract a prestored function having a high syntactic similarity to the error function as the reference function through similarity measurement of the converted position-driven characteristic vectors.

Meanwhile, the processor 110 may generate at least one repair template including at least one reference function (S142).

Referring back to FIG. 6, the processor 110 may generate a first edit script for repairing the error function to at least one reference function based on a first repair template among one or more repair templates (S150).

Specifically, the processor 110 may generate at least one edit action based on the first repair template, and generate the first edit script including at least one generated edit action.

The processor 110 may verify whether the first edit script has the error based on test data including an input value and an output value (S160). Further, the processor 110 may transmit a signal including the first edit script to the external device (S170).

Specifically, a process of verifying whether the first script has an error and transmitting the signal including the first script will be described below with reference to FIG. 8.

Referring to FIG. 8, the processor 110 may recognize whether the error of the first edit script is present (S161).

Specifically, the processor 110 may apply the first edit script to the first program, and input the input value of the test data into the first program repaired based on the first edit script. The processor 110 may verify whether the error occurs by comparing a value output from the repaired first program and an output value corresponding to the input value included in the test data. For example, the processor 110 may recognize that the error of the first edit script is not present when the value and the output value are the same as each other as a result of comparing the value output from the repaired first program and the output value corresponding to the input value included in the test data. As another example, the processor 110 may recognize that the error of the first edit script is present when the value and the output value are not the same as each other as a result of comparing the value output from the repaired first program and the output value corresponding to the input value included in the test data.

Here, when the processor 110 recognizes that the error of the first edit script is not present (No in S161), the processor 110 may transmit the signal including the first edit script to the external device 200 through the network unit 150 (S170).

When the processor 110 recognizes that the error of the first edit script is present (Yes in S161), the processor 110 may generate a second edit script for repairing the error function to at least one reference function based on a second repair template among one or more repair templates (S162).

Specifically, the processor 110 may generate at least one edit action based on the second repair template, and generate the second edit script including at least one generated edit action.

The processor 110 may verify whether the second edit script has the error based on the test data (S163).

Specifically, the processor 110 may apply the second edit script to the first program, and input the input value of the test data into the first program repaired based on the second edit script. The processor 110 may verify whether the error occurs by comparing a value output from the repaired first program and an output value corresponding to the input value included in the test data.

When the processor 110 recognizes that the error of the second edit script is not present, the processor 110 may transmit the signal including the second edit script to the external device 200 (S164).

Here, when the processor 110 recognizes that the error of the second edit script is present, the processor 110 may repeatedly perform the steps (S162 and S163) until recognizing that the error of the script is not present.

The steps illustrated in FIGS. 6 to 8 are exemplary steps, and it is also apparent that some of the steps of FIGS. 6 to 8 may be omitted or additional steps may be present in the limit that does not depart from the scope of the idea of the spirit of the present disclosure. Further, specific contents regarding the components (the computing device 100 and the external device 200) disclosed in FIGS. 6 to 8 may be replaced with the contents described through FIGS. 1 to 5 above.

Next, a process for feedback of a program according to some exemplary embodiments of the present disclosure will be described below through an example.

Figure 9:
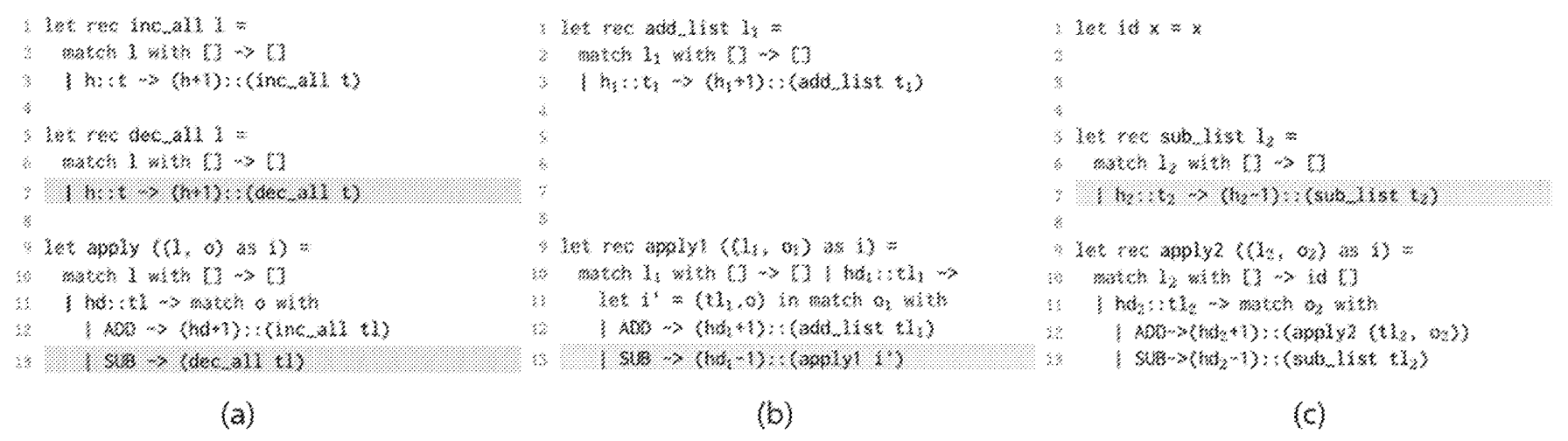

FIG. 9 is a diagram illustrating programs used in a process of feedback of a program, which is performed by the computing device according to some exemplary embodiments of the present disclosure.

Here, FIG. 9A may be a first program received from the external device 200 in the computing device 100. FIG. 9B may be a first correct answer program among correct answer programs prestored in the computing device 100. FIG. 9C may be a second correct answer program among the correct answer programs prestored in the computing device 100.

Referring to FIG. 9, the computing device 100 analyzes respective functions included in a first program received from the external device 200 to recognize calling-contexts of the respective functions included in the first program.

For example, the computing device 100 analyzes the first program (FIG. 9A) to recognize that the first program (FIG. 9A) calls functions inc_all and sub_all when an operator o is ADD and SUB, respectively by inputting function apply.

The computing device 100 may match the respective functions included in the first program received from the external device 200 with respective functions included in a prestored correct answer program corresponding to the first program.

For example, the computing device 100 may recognize a program of implementing the function apply of applying the operator all elements of a list as the correct answer program corresponding to the first program by receiving the operator o which is distinguished into an integer list 1 and ADD or SUB. The correct answer program corresponding to the first program may increase values of respective elements of the list by 1 when the operator is ADD and conversely decrease all values by 1 when the operator is SUB. In addition, the computing device 100 may match respective functions included in the first program (FIG. 9A) and respective functions stored in the recognized correct answer program.

The computing device 100 may identify error functions different from the respective functions included in the correct answer program among the respective functions included in the first program.

For example, the computing device 100 may be implement so that the first program (FIG. 9A) performs an addition with a real number in function dec_all which takes charge of a subtraction (line 7), and recognize that there is a problem in that the subtraction is not applied to a first element when the input operator is SUB in the function apply (line 13). Therefore, the computing device 100 may identify the function dec_all that takes charge of the subtraction (line 7) and the function apply (line 13) as the error function in the first program (FIG. 9A).

The computing device 100 may generate at least one repairing template including at least one reference function extracted based on the calling-context for the function of the specific function in order to repair the error function among the prestored functions.

Specifically, the related art determines the function based on a syntactic comparison of the function. Therefore, since function add_list of the first correct answer program (FIG. 9B) has the same context as dec_all which is the error function of the first program (FIG. 9A), the related art selects the function add_list of the first correct answer program (FIG. 9B) as a function for repairing dec_all which is the error function of the first program (FIG. 9A). Therefore, the related art has a problem in that generating an appropriate feedback is consequently unsuccessful by wrongly selecting the reference function for repairing the error function.

The computing device 100 according to some exemplary embodiments of the present disclosure may compare the function based on a calling-context other than not a syntax of the function but the function is called, i.e., the calling-context in order to solve such a problem.

For example, dec_all which is the error function of the first program (FIG. 9A) is called when an input list 1 is a form of hd::t in a main function apply and the input operator o is SUB. A function sub_list of the second correct answer program (FIG. 9C) is called when the input list 1 of a main function apply2 is a form of hd::t and the operator o is SUB. Therefore, the computing device 100 may recognize that the input lists 1 of the main function apply2 the calling-contexts in the error function dec_all of the first program (FIG. 9A) and the function sub_list of the second correct answer program (FIG. 9C) are the same as each other.

On the contrary, the function add_list of the firs correct answer program (FIG. 9B) is called when the input list 1 is the form of hd::t and the operator o is ADD. Therefore, the computing device 100 may recognize that the input list 1 in the function add_list of the first correct answer program (FIG. 9B) does not have the same calling-context as the input list 1 of the error function dec_all of the first program (FIG. 9A).

Therefore, the computing device 100 may recognize that using the function sub-list of the second correct answer program (FIG. 9C) having the same calling-context as the reference function is most appropriate in order to repair dec_all which is the error function of the first program (FIG. 9A).

The computing device 100 may generate a first edit script for repairing the error function to at least one reference function based on a first repair template among one or more repair templates.

Further, the computing device 100 may transmit a signal including the first edit script to the external device 200.

Next, an experimental example and an experimental result according to the method for feedback of a program according to some exemplary embodiments of the present disclosure will be described below.

Experimental Example 11

Performances of the method for feedback of a program according to some exemplary embodiments of the present disclosure and the method for feedback of a program in the related art were measured. Specifically, the method for feedback of a program according to some exemplary embodiments of the present disclosure as an automatic feedback generation technique for an OCaml programming task was named as CAFE.

The method for feedback of a program in the related art used FixML and SARFGEN. Specifically, since the SARFGEN is a technique for a Python programming language, the SARFGEN for an OCaml language such as Frog (a program unit SARFGEN algorithm) and Func (a function unit SARFGEN algorithm) was implemented in this experiment and used in the experiment.

For performance evaluation, 4211 submissions (e.g., a program generated by the user in the external device) were used, which actual students submitted submit for 10 programming tasks. In order to distinguish all submissions, a test set was used, which is constituted by a minimum of 10 test cases to a maximum of 33 test cases per question. Consequently, 664 correct answer submissions and 3547 incorrect answer submissions were used in the experiment. All submissions are compilable programs without a syntax error or a type error. For more accurate evaluation for each benchmark, each benchmark was classified into questions having an easy difficulty (questions 1 to 4), questions having an intermediate difficulty (questions 5 to 7), and questions having a difficult difficulty (questions 8 to 10).

All experiments were performed in iMac using an Intel i5 CPU and a 16-GB memory. Evaluation of each feedback generation tool was performed by a scheme of attempting to generate a feedback (e.g., an edit script) for up to 1 minute for each of 3547 incorrect answer programs. When a specific feedback generation tool succeeded in generating the feedback within 1 minute, a time required for generating the feedback was recorded. It was checked whether a proper feedback was actually provided through manual validation for a result generated by each system.

An experimental result is shown in [Table 1] below.

Referring to [Table 1], "Fix (%)" of each column represents the number and a ratio of feedbacks generated by respective tools, and "Time" means a mean time required for generating all feedbacks.

In the experiment result, it may be confirmed that the method (CAFE) for feedback of a program according to some exemplary embodiments of the present disclosure may generate most feedbacks (548 feedbacks) averagely within the earliest time (1.6 seconds) by comparing with the related art. In particular, the method (CAFE) for feedback of a program according to some exemplary embodiments of the present disclosure could successfully generate the feedback even for a long submission having 100 lines or more which could not achieve the related art. That is, it can be seen that the method for feedback of a program according to some exemplary embodiments of the present disclosure shows higher performance than the related art.

FIG. 10 is a simple and general schematic diagram illustrating an example of a computing environment in which exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

TABLE 1

| No. | Number of incorrect answers | FixML #Fix (%) | | Time | SARFGEN (Prog) #Fix (%) | | Time | SARFGEN (Func) #Fix (%) | | Time | CAFE #Fix (%) | | Time |
|---|---|---|---|---|---|---|---|---|---|---|---|---|---|
| 1 | 45 | 40 | (89%) | 0.3 | 33 | (73%) | 0.0 | 45 | (100%) | 0.0 | 45 | (100%) | 0.0 |
| 2 | 19 | 12 | (63%) | 3.1 | 19 | (100%) | 0.0 | 19 | (100%) | 0.0 | 19 | (100%) | 0.0 |
| 3 | 9 | 7 | (78%) | 0.1 | 8 | (89%) | 0.0 | 8 | (89%) | 0.0 | 9 | (100%) | 0.0 |
| 4 | 32 | 12 | (38%) | 1.6 | 17 | (53%) | 3.2 | 17 | (53%) | 3.2 | 29 | (91%) | 2.1 |
| 5 | 49 | 26 | (53%) | 11.8 | 31 | (63%) | 2.7 | 35 | (71%) | 2.6 | 42 | (86%) | 1.1 |
| 6 | 32 | 10 | (31%) | 4.1 | 8 | (25%) | 0.1 | 9 | (28%) | 1.6 | 23 | (72%) | 3.0 |
| 7 | 35 | 18 | (51%) | 23.3 | 25 | (71%) | 8.7 | 23 | (66%) | 3.1 | 30 | (86%) | 1.0 |
| 8 | 111 | 44 | (40%) | 1.5 | 67 | (60%) | 2.1 | 71 | (64%) | 1.8 | 78 | (70%) | 0.5 |
| 9 | 141 | 23 | (16%) | 1.5 | 71 | (50%) | 0.5 | 99 | (70%) | 2.7 | 133 | (94%) | 1.8 |
| 10 | 191 | 42 | (22%) | 1.1 | 114 | (60%) | 1.6 | 118 | (62%) | 2.4 | 140 | (73%) | 3.0 |
| Total sum | 664 | 234 | (35%) | 3.9 | 393 | (59%) | 1.9 | 444 | (67%) | 2.1 | 548 | (83%) | 1.6 |

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method for feedback of a program, which is performed by a computing device including at least one processor, the method comprising:
matching respective functions included in a first program received from an external device with respective functions included in a prestored correct answer program corresponding to the first program;
identifying error functions different from the respective functions included in the correct answer program among the respective functions included in the first program;
generating at least one repair template including at least one reference function extracted based on a calling-context for a function of a specific function in order to repair the error function among the prestored functions;

generating a first edit script for repairing the error function to the at least one reference function based on a first repair template among the at least one repair templates; and transmitting a signal including the first edit script to the external device.

2. The method of claim 1, further comprising:

verifying whether the first edit script has an error based on test data including an input value and an output value before transmitting of the signal including the first edit script to the external device.

3. The method of claim 2, wherein the transmitting of the signal including the first edit script to the external device includes transmitting the signal including the first edit script to the external device when recognizing that the error of the first edit script is not present based on the test data.

4. The method of claim 2, comprising:

when recognizing that the error of the first edit script is present based on the test data, generating a second edit script for repairing the error function to the at least one reference function based on a second repair template among the at least one repair templates;

verifying whether the second edit script has the error based on the test data; and transmitting a signal including the second edit script to the external device when recognizing that the error of the second edit script is not present.

5. The method of claim 1, wherein the calling-context includes a path condition of an input variable when the specific function is called.

6. The method of claim 1, further comprising:

recognizing the calling-context of each of the functions included in the first program by analyzing the respective functions included in the first program before matching of the respective functions included in the first program received from the external device with respective functions included in the correct answer program corresponding to the first program.

7. The method of claim 1, wherein the generating of the at least one repair template includes extracting the at least one reference function based on a similarity between the prestored functions and the error function computed based on the calling-context, and generating the at least one repair template including the at least one reference function.

8. The method of claim 1, wherein the specific function includes at least one of the respective functions included in the first program, the respective functions included in the prestored correct answer program, and the prestored presentee-functions.

9. The method of claim 1, wherein the generating of the at least one repair template includes when recognizing that the calling-context of the specific function is not present, generating the calling-context of the specific function by using calling-context tunneling.

10. The method of claim 9, wherein the generating of the calling-context of the specific function includes when recognizing that the calling-context of the specific function is not present, generating a calling-context of a caller who calls the specific function to the calling-context of the specific function.

11. A non-transitory computer readable storage medium including a computer program, wherein the computer program executes a method for feedback of a program when the computer program is executed by one or more processors, the method comprising:

matching respective functions included in a first program received from an external device with respective functions included in a prestored correct answer program corresponding to the first program;

identifying error functions different from the respective functions included in the correct answer program among the respective functions included in the first program;

generating at least one repair template including at least one reference function extracted based on a calling-context for a function of a specific function in order to repair the error function among the prestored functions;

generating a first edit script for repairing the error function to the at least one reference function based on a first repair template among the at least one repair templates; and transmitting a signal including the first edit script to the external device.

12. A computing device for feedback of a program, the computing device comprising:

a processor including at least one core; and a memory including program codes executable by the processor, wherein the processor is configured to match respective functions included in a first program received from an external device with respective functions included in a prestored correct answer program corresponding to the first program, identify error functions different from the respective functions included in the correct answer program among the respective functions included in the first program, generate at least one repair template including at least one reference function extracted based on a calling-context for a function of a specific function in order to repair the error function among the prestored functions, generate a first edit script for repairing the error function to at least one reference function based on a first repair template among the at least one repair templates, and transmit a signal including the first edit script to the external device.

* * * * *